(12) United States Patent
Behera

(10) Patent No.: US 6,950,819 B1
(45) Date of Patent: Sep. 27, 2005

(54) SIMPLIFIED LDAP ACCESS CONTROL LANGUAGE SYSTEM

(75) Inventor: Prasanta Behera, Fremont, CA (US)

(73) Assignee: Netscape Communication Corporation, Mountain View, CA (US)

(*) Notice: Subject to any disclaimer, the term of this patent is extended or adjusted under 35 U.S.C. 154(b) by 0 days.

(21) Appl. No.: 09/447,443

(22) Filed: Nov. 22, 1999

(51) Int. Cl.[7] ............................................ G06F 17/00
(52) U.S. Cl. .......................... 707/9; 707/10; 709/217
(58) Field of Search .............................. 707/1–4, 8–10, 707/100–104.1, 200–202, 217, 223, 225; 345/751; 709/200–203, 217–219, 223, 225, 709/223.225; 713/200, 201

(56) References Cited

U.S. PATENT DOCUMENTS

| | | | | |
|---|---|---|---|---|
| 4,799,153 A | * | 1/1989 | Hann et al. .................. | 713/201 |
| 5,129,083 A | * | 7/1992 | Cutler et al. ............. | 707/103 R |
| 5,263,165 A | * | 11/1993 | Janis .......................... | 711/163 |
| 5,880,731 A | * | 3/1999 | Liles et al. ................. | 345/349 |
| 5,950,011 A | * | 9/1999 | Albrecht et al. ............... | 713/1 |
| 6,098,081 A | * | 8/2000 | Heidorn et al. ................ | 707/3 |
| 6,470,332 B1 | * | 10/2002 | Weschler ....................... | 707/3 |

FOREIGN PATENT DOCUMENTS

| | | | | |
|---|---|---|---|---|
| EP | 0473960 | 8/1991 | .................... | 15/40 |
| EP | 0952698 | 10/1999 | .................... | 12/24 |

* cited by examiner

*Primary Examiner*—Greta Robinson
*Assistant Examiner*—Harold E. Dobbs, Jr.
(74) *Attorney, Agent, or Firm*—Michael A. Glenn; Glenn Patent Group

(57) ABSTRACT

A simplified LDAP access language system provides user-defined attributes that tell the directory system who the user wants to give read or write access to a specific set of his attributes. The read and write attributes are separate lists and may, in fact, differ, thereby giving the user the flexibility to better manage access to his attributes. The value of the read and write attributes are in an LDAP Filter format which is an Internet standard (RFC 2254) which allows the user to specify not only users local to his intranet, but users across the Internet as well. Access control lists (ACL) are created by the System Administrators and list the specific attributes that the user is allowed to control read or write access, giving the Administrators full control of what information the user can give out. The ACLs are stored in the directory along with the entries. When a user accesses an entry in a directory, the server checks the ACL specified for the attributes being accessed. The read or write attribute for the owner of the attributes being accessed are used by the server when it checks the ACL. The combination of the read or write attribute and the ACL determine whether the user has permission to perform the read or write access to the attribute being accessed.

27 Claims, 4 Drawing Sheets

SIMPLIFIED LDAP ACCESS CONTROL LANGUAGE SYSTEM

BACKGROUND OF THE INVENTION

1. Technical Field

The invention relates to accessing information from a directory structure in a computer environment. More particularly, the invention relates to controlling access to data within LDAP directory structure in a computer environment.

2. Description of the Prior Art

A Lightweight Directory Access Protocol (LDAP) directory (such as Netscape Communications Corporation's Directory Server) is a collection of "entries." Each entry has a name (called the Distinguished Name) and a list of attribute values. The entries in a directory are organized in a tree structure, with major groupings that are subdivided into smaller units. A directory might contain several organization entries, each of which contains several organizationalUnit entries. These entries can be further subdivided.

LDAP provides search operations that can be performed over specified portions of the directory tree. Trees and subtrees, therefore, are a natural way to deal with data stored in an LDAP directory.

Entries and attributes correspond to a wide variety of data types such as personnel information, server configuration, business relationships, and user preferences. Since all entries are stored within a single directory, a method is required to restrict the availability of specific information to authorized users.

The method used to control access is via Access Control Lists (ACL). The Directory Server Administrator (DSAdmin) creates some basic ACL rules that grant permission to certain users to access various information in the directory. Most of the security considerations will require from tens to hundreds of rules to implement. The smaller number of ACL rules offers better performance and easier manageability.

Because a directory is the critical central repository in an intranet containing collections of information, e.g., about people, it is imperative that a rich set of access options/features be provided. For example, the user should be able to modify his entry, or to update his home address or home phone number without any DSAdmin intervention.

A better feature would be to give the user the ability to decide who can access some of his personal information. The only way to do that is to allow users to create ACLs. However, a directory can contain millions of entries such as the directory used by Netscape's Netcenter. To support this size of a directory using the traditional approach would require millions of ACLs which would not only degrade the server's performance but would also be highly unmanageable. It also creates a risk, i.e., the user can create a rule denying the DSAdmin some privileges which is unacceptable.

Another disadvantage is that ACL syntax are generally complex. A normal user is unable to understand the format and fields of the rules to be able to use the rules effectively and safely.

It would be advantageous to provide a simplified access control language that gives the system administrator the ability to allow a user to specify a list of people that have access to certain attributes of that user's directory entry information. It would further be advantageous to provide a simplified access control language that provides a simple mechanism to allow a user to make those specifications.

SUMMARY OF THE INVENTION

The invention provides a simplified LDAP access control. The system provides a simple command language that allows a system administrator to give a user the flexibility to specify a list of people that have access to certain attributes in a directory entry. In addition, the invention provides a mechanism that allows a user to easily specify access lists without having to learn a complicated command syntax.

A preferred embodiment of the invention provides user-defined attributes that tell the directory system who the user wants to give read or write access to a specific set of his attributes. The read and write attributes are separate lists and may, in fact, differ. This gives the user the flexibility to better manage access to his attributes.

The value of the read and write attributes are in an LDAP Filter format which is an Internet standard (RFC 2254). The filter properties allow the user to specify not only users local to his intranet, but users across the Internet as well.

Access control lists (ACL) are created by the System Administrators. The ACLs list the specific attributes that the user is allowed to control read or write access. This gives the Administrators full control of what information the user can give out.

The ACLs are stored in the directory along with the entries. When a user accesses an entry in a directory, the server checks the ACL specified for the attributes being accessed. The read or write attribute for the owner of the attributes being accessed are used by the server when it checks the ACL. The combination of the read or write attribute and the AC L determine whether the user has permission to perform the read or write access to the attribute being accessed.

Other aspects and advantages of the invention will become apparent from the following detailed description in combination with the accompanying drawings, illustrating, by way of example, the principles of the invention.

DETAILED DESCRIPTION OF THE INVENTION

Figure 1:
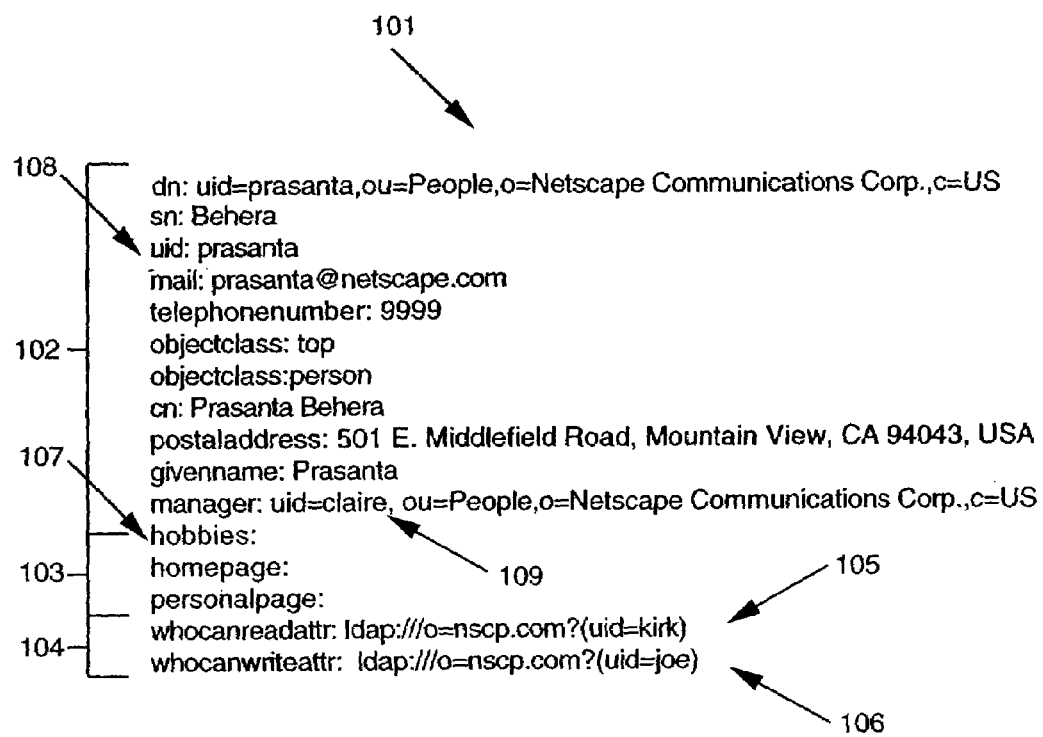
FIG. 1 is a diagram of an LDAP directory entry according to the invention.

The invention is embodied in a simplified LDAP access control language system in a computer environment. A system according to the invention provides a simple command language that allows a system administrator to give a user the flexibility to specify a list of people that have access to certain attributes in a directory entry. In addition, the invention provides a system that allows a user to easily specify access lists without having to learn a complicated syntax.

A Lightweight Directory Access Protocol (LDAP) directory (such as Netscape Communications Corporation's Directory Server) is a collection of "entries." Each entry has a name (called the Distinguished Name) and a list of attribute values. The entries in a directory are organized in a tree structure, with major groupings that are subdivided into smaller units. A directory might contain several organization entries, each of which contains several organizationalUnit entries. These entries can be further subdivided.

LDAP provides search operations that can be performed over specified portions of the directory tree. Trees and subtrees, therefore, are a natural way to deal with data stored in an LDAP directory.

Entries and attributes correspond to a wide variety of data types such as personnel information, server configuration, business relationships, and user preferences. Since all entries are stored within a single directory, a method is required to restrict the availability of specific information to authorized users.

The method used to control access is via Access Control Lists (ACL). The Directory Server Administrator (DSAdmin) creates some basic ACL rules that grant permission to certain users to access various information in the directory. Most of the security considerations will require from tens to hundreds of rules to implement. The smaller number of ACL rules offers better performance and easier manageability.

Because a directory is the critical central repository in an intranet containing collections of information, e.g., about people, it is imperative that a rich set of access options/features be provided. For example, the user should be able to modify his entry, or to update his home address or home phone number without any DSAdmin intervention.

A better feature would be to give the user the ability to decide who can access some of his personal information. The only way to do that is to allow users to create ACLs. However, a directory can contain millions of entries such as the directory used by Netscape's Netcenter. To support this size of a directory would require millions of ACLs which would not only degrade the server's performance but would also be highly unmanageable. It also creates a risk, i.e., the user can create a rule denying the DSAdmin some privileges which is unacceptable.

Another disadvantage is that ACL syntax are generally complex. A normal user is unable to understand the format and fields of the rules to be able to use the rules effectively and safely.

The problems that are presented are:
  How to let users manage some of their own information.
  How can the DSAdmin manage the information so that no security rules are violated.
  How to make the server manageable under the above circumstances.
  Ideally, a DSAdmin would like to have rules that perform the following tasks (out of n attributes in a directory):
1. Allow n1 attributes to be read by anyone in the world (this is a typical requirement). Example attributes are cn, sn, phonenumber.
2. Allow n2 attributes to be read and modifiable by the user himself, e.g., home address, home phonenumber.
3. Allow n3 attributes to be managed by an owner/manager, e.g., salary, employeegrade.
4. Allow n4 attributes to be managed by the user, i.e., the user decides who can read or modify the attributes, For example, the user can decide that only Sam can read his hobbies attribute and only Kelly can read or change emergency contact info so that she can keep it up to date.
5. Do not allow the rest n5=[n−(n1+n2+n3+n4)] attributes to be accessible to the general public except for the Administrator group, e.g., employee status.

Solving 1, 2, 3 & 5 are fairly straightforward and not explained below. The only difficult item is the 4th case. As previously mentioned, to enable this feature requires that the user be provided the ability to create his own ACLs. This could lead to millions of ACLs—which is not acceptable. The remainder of this document describes a novel approach to overcome these problems using a few ACLs and an existing Internet standard.

One area where this is applicable is in Netscape's Netcenter which has a registry of Netcenter members. All of the member information is stored in a directory server. The Netcenter Administrators would not only prefer to maintain the member's information/profiles but would also like to provide flexibility to allow members to maintain some other key information which other members can access. There is an immediate need with no current solution that can take care of this problem in an elegant way.

One skilled in the art will readily appreciate that although LDAP directories are mentioned throughout, the invention can be implemented in any directory application. Additionally, although the examples cited concern attributes pertaining to people, one skilled in the art will readily appreciate that the invention can control access to any attributes stored in a system.

Referring to FIG. 1, an example of a person's LDAP directory entry 101 is shown. Attributes are listed that pertain to a particular individual. Some of these attributes are controlled by the Administrator 102, e.g., dn, sn, uid. A certain number of attributes 103 are the attributes that the user wants to control read and write access, e.g., hobbies, homepage, personalpage.

The LDAP standard is very flexible. It allows extension of the schema by adding new attributes or objectclasses. One can add a new attribute called "hobbies" 107 to an entry as long as the objectclass which has that attribute has been added.

Figure 2:
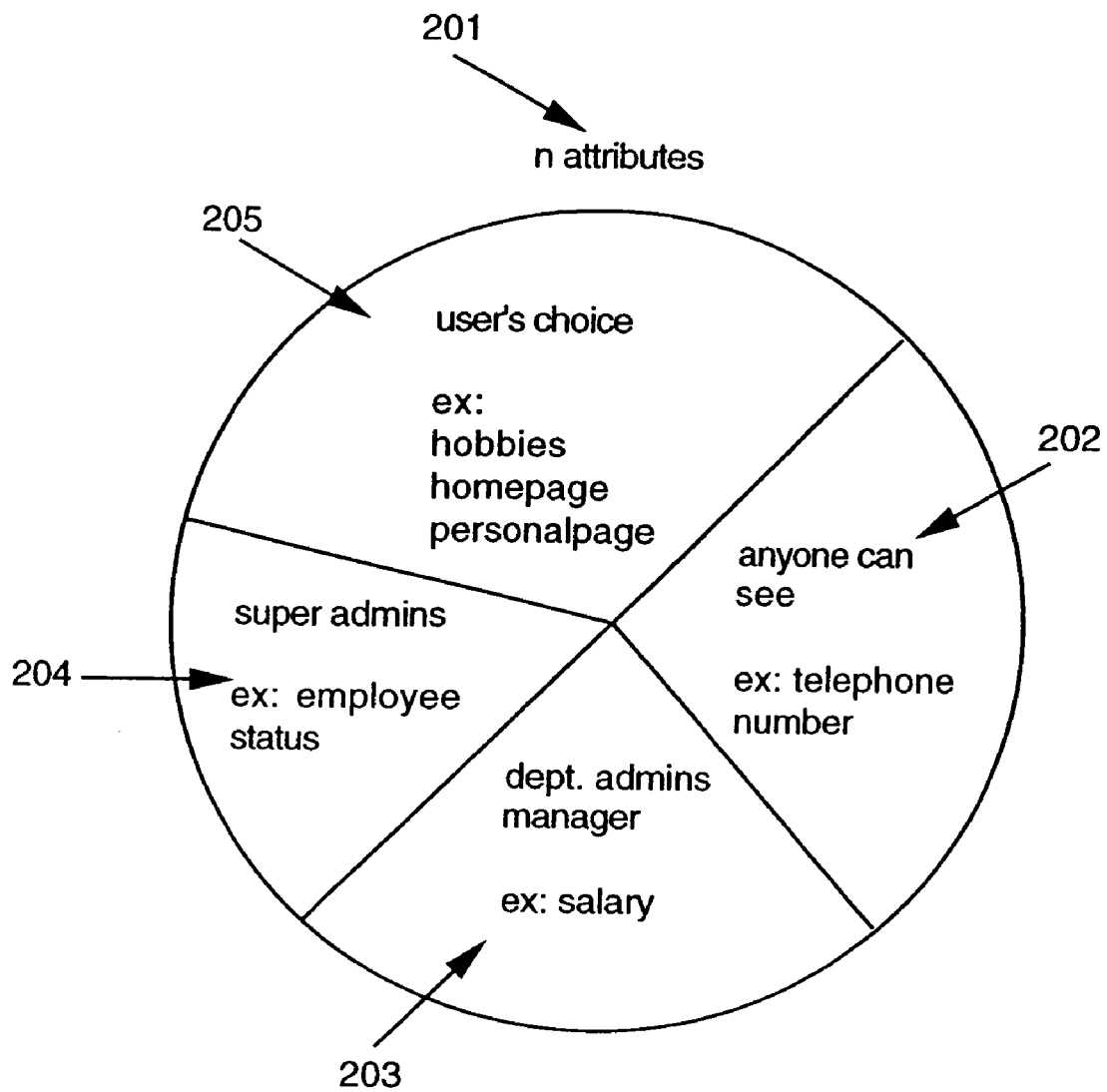
FIG. 2 is a schematic diagram of an example of how n attributes are accessed according to the invention.

With respect to FIG. 2, the ideal situation is when, given n attributes 201, some of the attributes are public 202, e.g., telephonenumber, where any user can see them. Other attributes are private and are not normally available to other users. For example, department admins and managers can only access a person's salary attribute 203 or only super admins can access a person's employee status 204. The final set of attributes are the ones that the user controls 205, e.g., hobbies, homepage, and personalpage.

The following ACL syntax is used to explain how cases 1, 2, 3, & 5 are solved. Note, the syntax is used for reference only.
  Allow n1 attributes to be read by anyone:
    ACL: (list of n1 attrs) (allow (read) user="anyone")
  Allow n2 attributes to be read/writeable by self:
    ACL: (list of n2 attrs) (allow (read, write) user="self")
  Allow n5 attrs to be read/writeable by the admin group only:
    ACL: (list of n5 attrs) (allow (read, write) group="Admingroup")
  Allow the owner or the manager to manage the n3 attributes:
    ACL: (list of n3 attributes) (allow (read, write) attr="manager" or attr="owner")
  Referring again to FIG. 1, user Prasanta's 108 manager is Claire 109 and she can read/write the list of n3 attributes. Similarly, Joe's manager, Bill, can read/modify Joe's n3 attributes. This is achieved by using one ACL. The value of the "manager" is plugged in at runtime.

For case 4, the requirements are more complex. Out of the n4 attributes, a finer granularity must be achieved, i.e., the n4 attributes can be read by certain people (n4-read attrs) and can be modified by certain people (not necessarily the same people that can read the attributes) (n4-write attrs). A preferred embodiment of the invention solves the 4th case by providing an ACL similar to the other cases, but also using user-defined attributes.

Referring again to FIG. 1, the user-defined attributes 104 tell the system who the user wants to give permission to read 105 and write 106 to his attributes 103. It is evident that the read 105 and write 106 attributes are separate lists and may, in fact, differ. This gives the user the flexibility to better manage access to his attributes.

The invention's ACL syntax is as follows (using the example discussed earlier):

ACL: (list of n4-read attrs) (allow (read) filterattr="whocanreadattr")
Ex: (hobbies, emergencyContact) (allow (read) filterattr="whocanreadattr")
ACL: (list of n4-write attrs) (allow (write) filterattr="whocanwriteattr")
Ex: (emergencyContact) (allow (write) filterattr="whocanwriteattr")

where the values of a whocanreadattr & whocanwriteattr are:

whocanreadattr: (((Idap:///o=abc.com?(uid=sam)) (uid=kelly))
whocanwriteattr: (uid=kelly)

Figure 3:
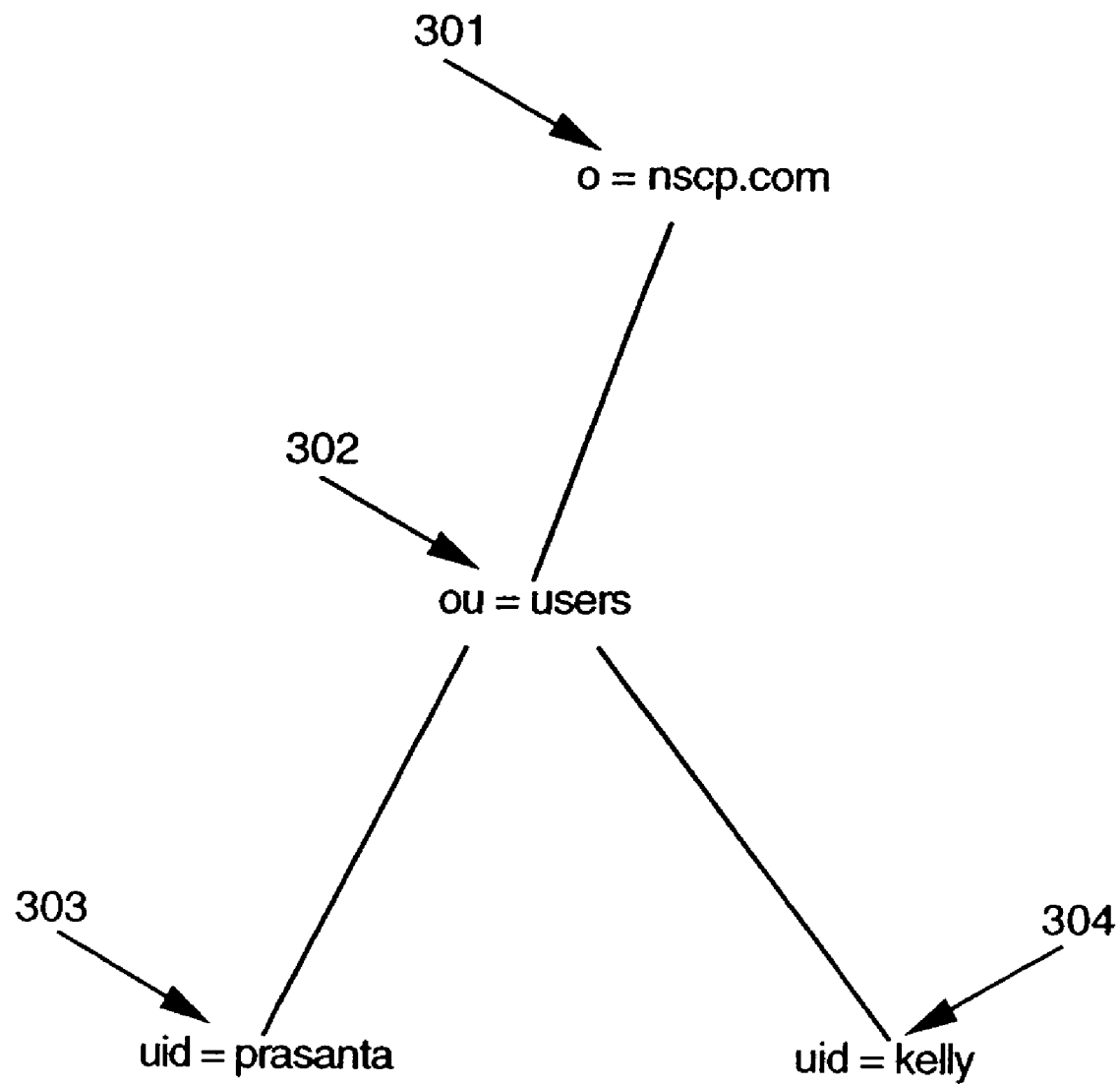
FIG. 3 is a block schematic diagram depicting the organization of users in a company hierarchical tree according to the invention.

The value of the read and write attributes are in an LDAP Filter format which is an Internet standard (RFC 2254). The ACLs are created by the DSAdmin. This gives the DSAdmin full control of what information the user can give out. With respect to FIG. 3, the filter properties allow the user to specify not only users local to his intranet, but users across the Internet as well. In the example above, Prasanta 303 and Kelly 304 are users 302 in the same company, Netscape 301. The "whocanreadattr" gives Sam who is from ABC company and Kelly who is from Netscape, read access.

Figure 4:
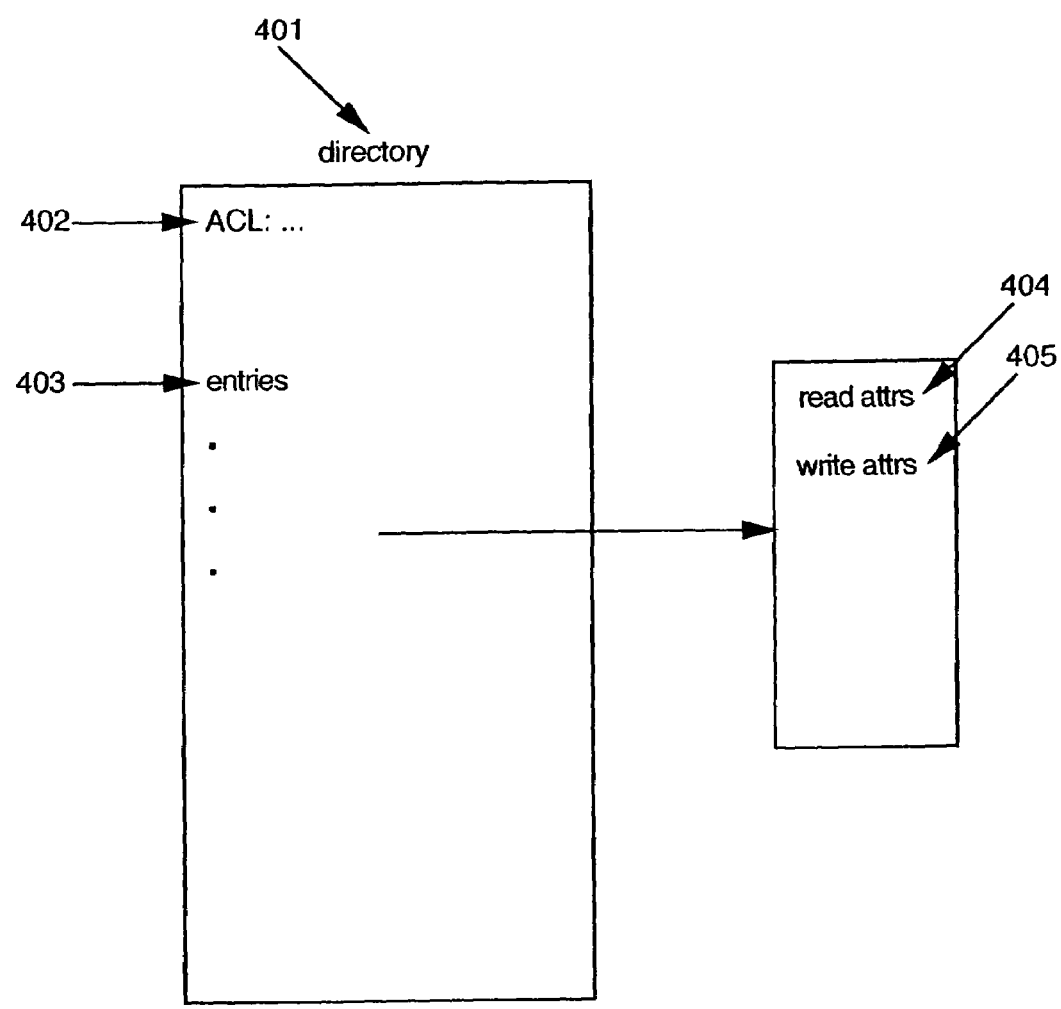
FIG. 4 is a block schematic diagram of a directory including ACLs, entries and read/write attributes according to the invention.

Referring to FIG. 4, the ACLs 402 are stored in the directory 401 along with the entries 403. When a user accesses an entry 403 in a directory 401, the server checks the ACL 402 specified for the attributes being accessed. The read 404 or write 405 attribute for the owner of the attributes being accessed are used by the server when it checks the ACL 402.

Using the above example, the value of "whocanwriteattr" is plugged in by the server at runtime with "(uid=kelly)". So, if Kelly is the accessing client, the filter matches to TRUE and Kelly is allowed to modify the "emergencyContact" attribute. However, if Bill is the client, the filter matches to FALSE and Bill is denied the privilege. Each user can now create LDAP Filters which will allow them to manage their own information.

The advantages of the invention are:
The Admin has complete control of what a user can do.
Only a handful of ACLs are needed instead of millions.
The performance of the server is markedly increased.
The value of the new attributes are based on an Internet standard.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A process for a simplified access control language that controls access to directory entries in a computer environment, comprising the steps of:

a system administrator creating a read access control list (ACL) command for a user, wherein said
read access control list command lists a set of Lightweight Directory Access Protocol (LDAP) user attributes that are created and controlled by said administrator;
said user applying said read access control list command by listing a subset from said system administrator defined LDAP user attributes for authorizing read access to said subset of user attributes to one or more other users, and by listing
user identifications of said one or more other users such that said one or more other users are authorized to have read access to said subset of said system administrator defined LDAP user attributes;
storing said read access control list command in a directory, said directory containing said user attributes; and
responsive to one or more other users accessing any of said user attributes in said directory, said read access control list command referring to said list of user identifications at runtime thereby allowing said one or more other users read access to said system administrator defined LDAP user attributes.

2. The process of claim 1, wherein upon a client read access, the directory server selects a specific read access control command according to the attribute being accessed and refers to the read list of the owner of the attribute being accessed to determine if said client has permission to execute said read access.

3. The process of claim 1, further comprising the steps of:
providing a user defined write list containing user identifications that are allowed to write a specified set of attributes;
providing a system administrator defined write access control command;
said write access control command listing the user attributes that said administrator has selected for user defined write access; and
said write access control command referring to said user defined write list thereby allowing said write user identifications write access to said user attributes.

4. The process of claim 3, wherein upon a client write access, the directory server selects a specific write access control command according to the attribute being accessed and refers to the write list of the owner of the attribute being accessed to determine if said client has permission to execute said write access.

5. A process for a simplified access control language that controls access to directory entries in a computer environment, comprising the steps of:

a system administrator creating a read access control list (ACL) command that lists Lightweight Directory Access Protocol (LDAP) user attributes that said administrator has created for user defined read access, said user selecting a subset of said LDAP user attributes from said list for read access to one or more other users;
a system administrator creating a write access control list (ACL) command that lists Lightweight Directory Access Protocol (LDAP) user attributes that said administrator has created for user defined write access, said user selecting a subset of said LDAP user attributes from said list for write access to one or more other users;
providing a plurality of user defined access control list command attribute read lists containing user identifications of said one or more other users that are allowed to read said user defined subset from said LDAP user attributes that said administrator has created for user defined read access;

providing a plurality of user defined access control list command attribute write lists containing user identifications of said one or more other users that are allowed to write said user defined subset from said LDAP user attributes that said administrator has created for user defined write access; and storing said read access control list command and said write access control list command reside in a directory containing said LDAP user attributes;

wherein responsive to one or more other users requesting read access to one of the LDAP user attributes, applying said read access control list command and the read list of the owner of the attribute being accessed to determine if said one or more other users has permission to execute said read access; and wherein responsive to one or more other users requesting write access to one of the LDAP user attributes, applying said write access control list command and the write list of the owner of the attribute being accessed to determine if said one or more other users has permission to execute said write access.

6. A process for a simplified access control language that controls access to directory entries in a computer environment, comprising the steps of:

a system administrator creating a write access control list (ACL) command for a user, wherein said write access control list command lists a set of Lightweight Directory Access Protocol (LDAP) user attributes that are created and controlled by said administrator;

said user applying said write access control list command by listing a subset from said system administrator defined LDAP user attributes for authorizing write access to said subset of user attributes to one or more other users, and by listing user identifications of said one or more other users such that said one or more other users are authorized to have write access to said subset of said system administrator defined LDAP user attributes;

storing said write access control list command in a directory, said directory containing said user attributes; and responsive to one or more other users accessing any of said user attributes in said directory, said write access control list command referring to said list of user identifications at runtime thereby allowing said one or more other users write access to said system administrator defined LDAP user attributes.

7. The process of claim 6, wherein upon a client write access, the directory server selects a specific write access control command according to the attribute being accessed and refers to the write list of the owner of the attribute being accessed to determine if said client has permission to execute said write access.

8. The process of claim 6, further comprising the steps of:

providing a user defined read list containing user identifications that are allowed to read a specified set of attributes; and providing a system administrator defined read access control command;

wherein said read access control command lists the user attributes that said administrator has selected for user defined read access; and wherein said read access control command refers to said user defined read list thereby allowing said read user identifications read access to said user attributes.

9. The process of claim 8, wherein upon a client read access, the directory server selects a specific read access control command according to the attribute being accessed and refers to the read list of the owner of the attribute being accessed to determine if said client has permission to execute said read access.

10. An apparatus for a simplified access control language that controls access to directory entries in a computer environment, comprising:

means for a system administrator creating a read access control list (ACL) command for a user, wherein said read access control list command lists a set of Lightweight Directory Access Protocol (LDAP) user attributes that are created and controlled by said administrator;

means for said user applying said read access control list command by listing a subset from said system administrator defined LDAP user attributes for authorizing read access to said subset of user attributes to one or more other users; and, by listing user identifications of said one or more other users such that said one or more other users are authorized to have read access to said subset of said system administrator defined LDAP user attributes;

means for storing said read access control list command in a directory, said directory containing said user attributes; and responsive to one or more other users accessing any of said user attributes in said directory, means for said read access control list command referring to said list of user identifications at runtime thereby allowing said one or more other users read access to said system administrator defined LDAP user attributes.

11. The apparatus of claim 10, wherein upon a client read access, the directory server selects a specific read access control command according to the attribute being accessed and refers to the read list of the owner of the attribute being accessed to determine if said client has permission to execute said read access.

12. The apparatus of claim 10, further comprising:

a user defined write list containing user identifications that are allowed to write a specified set of attributes; and a system administrator defined write access control command;

wherein said write access control command lists the user attributes that said administrator has selected for user defined write access; and wherein said write access control command refers to said user defined write list thereby allowing said write user identifications write access to said user attributes.

13. The apparatus of claim 12, wherein upon a client write access, the directory server selects a specific write access control command according to the attribute being accessed and refers to the write list of the owner of the attribute being accessed to determine if said client has permission to execute said write access.

14. An apparatus for a simplified access control language that controls access to directory entries in a computer environment, comprising:

means for a system administrator creating a read access control list (ACL) command for a user that lists Lightweight Directory Access Protocol (LDAP) user attributes that said administrator has created for user defined read access, said user selecting a subset of said LDAP user attributes from said list for read access to one or more other users;

means for a system administrator creating a write access' control list (ACL) command for a user that lists LDAP user attributes that said administrator has created for user defined write access, said user selecting a subset of said LDAP user attributes from said list for write access to one or more other users:

a plurality of user defined access control list command attribute read lists containing user identifications of said one or more other users that are allowed to read said user defined subset from said LDAP user attributes that said administrator has created for user defined read access;

a plurality of user defined access control list command attribute write lists containing user identifications of said one or more other users that are allowed to write said user defined subset from said LDAP user attributes that said administrator has created for user defined write access; and storing said read access control list command and said write access control list command reside in a directory containing said LDAP user attributes;

wherein responsive to one or more other users requesting read access to one of the LDAP user attributes, applying said read access control list command and the read list of the owner of the attribute being accessed to determine if said one or more other users has permission to execute said read access; and wherein responsive to one or more other users requesting write access to one of the LDAP user attributes, applying said write access control list command and the write list of the owner of the attribute being accessed to determine if said one or more other users has permission to execute said write access.

15. An apparatus for a simplified access control language that controls access to directory entries in a computer environment, comprising:

means for a system administrator creating a write access control list (ACL) command for a user, wherein said write access control list command lists a set of Lightweight Directory Access Protocol (LDAP) user attributes that are created and controlled by said administrator;

means for said user applying said write access control list command by listing a subset from said system administrator defined LDAP user attributes for authorizing write access to said subset of user attributes to one or more other users, and by listing user identifications of said one or more other users such that said one or more other users are authorized to have write access to said subset of said system administrator defined LDAP user attributes;

means for storing said write access control list command in a directory, said directory containing said user attributes; and responsive to one or more other users accessing any of said user attributes in said directory, means for said write access control list command referring to said list of user identifications at runtime thereby allowing said one or more other users write access to said system administrator defined LDAP user attributes.

16. The apparatus of claim 15, wherein upon a client write access, the directory server selects a specific write access control command according to the attribute being accessed and refers to the write list of the owner of the attribute being accessed to determine if said client has permission to execute said write access.

17. The apparatus of claim 15, further comprising:

a user defined read list containing user identifications that are allowed to read a specified set of attributes;

a system administrator defined read access control command;

wherein said read access control command lists the user attributes that said administrator has selected for user defined read access; and wherein said read access control command refers to said user defined read list thereby allowing said read user identifications read access to said user attributes.

18. The apparatus of claim 17, wherein upon a client read access, the directory server selects a specific read access control command according to the attribute being accessed and refers to the read list of the owner of the attribute being accessed to determine if said client has permission to execute said read access.

19. A program storage medium readable by a computer, tangibly embodying a program of instructions executable by the computer to perform method steps for a simplified access control language that controls access to directory entries in a computer environment, comprising the steps of:

a system administrator creating a read access control list (ACL) command for a user, wherein said read access control list command lists a set of Lightweight Directory Access Protocol (LDAP) user attributes that are created and controlled by said administrator;

said user applying said read access control list command by listing subset from said system administrator defined LDAP user attributes for authorizing read access to said subset of user attributes to one or more other users, and by listing user identifications of said one or more other users such that said one or more other users are authorized to have read access to said subset of said system administrator defined LDAP user attributes;

storing said read access control list command in a directory, said directory containing said user attributes; and responsive to one or more other users accessing any of said user attributes in said directory, said read access control list command referring to said list of user identifications at runtime thereby allowing said one or more other users read access to said system administrator defined LDAP user attributes.

20. The method of claim 19, wherein upon a client read access, the directory server selects a specific read access control command according to the attribute being accessed and refers to the read list of the owner of the attribute being accessed to determine if said client has permission to execute said read access.

21. The method of claim 19, further comprising the steps of:

providing a user defined write list containing user identifications that are allowed to write a specified set of attributes;

providing a system administrator defined write access control command;

said write access control command listing the user attributes that said administrator has selected for user defined write access; and said write access control command referring to said user defined write list thereby allowing said write user identifications write access to said user attributes.

22. The method of claim 21, wherein upon a client write access, the directory server selects a specific write access control command according to the attribute being accessed and refers to the write list of the owner of the attribute being accessed to determine if said client has permission to execute said write access.

23. A program storage medium readable by a computer, tangibly embodying a program of instructions executable by the computer to perform method steps for a simplified access control language that controls access to directory entries in a computer environment, comprising the steps of:
   a system administrator creating a read access control list (ACL) command that lists Lightweight Directory Access Protocol (LDAP) user attributes that said administrator has created for user defined read access, read access to one or more other users;
   a system administrator creating a write access control list (ACL) command that lists Lightweight Directory Access Protocol (LDAP) user attributes that said administrator has selected created for user defined write access, said user selecting a subset of said LDAP user attributes from said list for write access to one or more other users;
   providing a plurality of user defined access control list command attribute read lists containing user identifications of said one or more other users that are allowed to read said user defined subset from said LDAP user attributes that said administrator has created for user defined read access;
   providing a plurality of user defined access control list command attribute write lists containing user identifications of said one or more other users that are allowed to write said user defined subset from said LDAP user attributes that said administrator has created for user defined write access; and
   storing said read access control list command and said write access control list command reside in a directory containing said LDAP user attributes;
   wherein responsive to one or more other users requesting read access to one of the LDAP user attributes, applying said read access control list command and the read list of the owner of the attribute being accessed to determine if said one or more other users has permission to execute said read access; and
   wherein responsive to one or more other users requesting write access to one of the LDAP user attributes, applying said write access control list command and the write list of the owner of the attribute being accessed to determine if said one or more other users has permission to execute said write access.

24. A program storage medium readable by a computer, tangibly embodying a program of instructions executable by the computer to perform method steps for a simplified access control language that controls access to directory entries in a computer environment, comprising the steps of:
   a system administrator creating a write access control list command for a user, wherein said write access control list command lists a set of Lightweight Directory Access Protocol (LDAP) user attributes that are created and controlled by said administrator;
   said user applying said write access control list command by listing a subset from said system administrator defined LDAP user attributes for authorizing write access to said subset of user attributes to one or more other users, and by listing
   user identifications of said one or more other users such that said one or more other users are allowed authorized to have write access to said subset of said system administrator defined LDAP user attributes;
   storing said write access control list command in a directory, said directory containing said user attribute; and
   responsive to one or more other users accessing any of said user attributes in said directory, said write access control list command referring to said list of user identifications at runtime thereby allowing said one or more other users write access to said system administrator defined LDAP user attributes.

25. The method of claim 24, wherein upon a client write access, the directory server selects a specific write access control command according to the attribute being accessed and refers to the write list of the owner of the attribute being accessed to determine if said client has permission to execute said write access.

26. The method of claim 24, further comprising the steps of:
   providing a user defined read list containing user identifications that are allowed to read a specified set of attributes; and
   providing a system administrator defined read access control command;
   wherein said read access control command lists the user attributes that said administrator has selected for user defined read access; and
   wherein said read access control command refers to said user defined read list thereby allowing said read user identifications read access to said user attributes.

27. The method of claim 26, wherein upon a client read access, the directory server selects a specific read access control command according to the attribute being accessed and refers to the read list of the owner of the attribute being accessed to determine if said client has permission to execute said read access.

* * * * *